April 21, 1959 W. W. FRITSCHI 2,883,474
TRANSISTOR GATING CIRCUIT
Filed Dec. 24, 1957
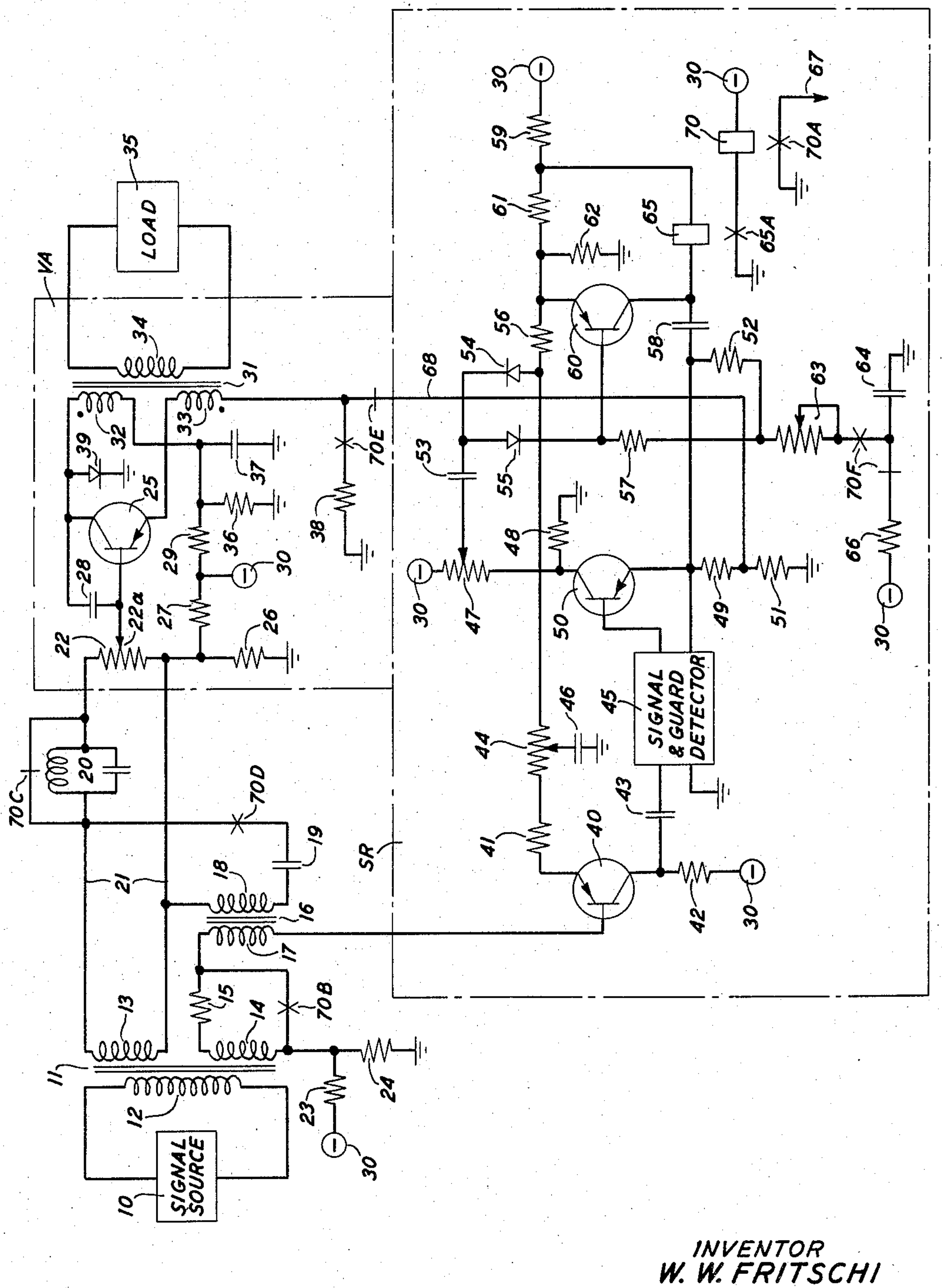
INVENTOR
W. W. FRITSCHI
BY Patrick J. Roche
ATTORNEY United States Patent Office 2,883,474

Patented Apr. 21, 1959

2,883,474

TRANSISTOR GATING CIRCUIT

Walter W. Fritschi, Bayside, N.Y., assignor to Bell Telephone Laboratories, Incorporated, New York, N.Y., a corporation of New York Application December 24, 1957, Serial No. 704,991

12 Claims. (Cl. 179—84)

This invention relates to a gating circuit for a voice-frequency signaling transmission system and more specifically to such a gating circuit using transistors.

Of the many uses to which transistor gating circuits may be put a significant application relates to a voice-frequency alternating-current signaling system. In such signaling systems signals are transmitted over voice-frequency channels between telephone central offices and toll switching centers, for example, by alternating-current impulses of a single frequency within the voice band. It is necessary where a multi-link tandem path exists between originating and terminating offices to confine these signals to a single link. However, upon the cessation of signaling impulses when a through connection is established, the full voice-frequency band must be made available for talking purposes on a multi-link basis. Therefore, an arrangement must be so provided as to operate immediately on receipt of a voice-frequency signal to block the voice path to the current of such signal. This is accomplished in a novel manner in accordance with the gating circuit of the invention.

The main object of the present invention is to gate a normally operating voice transmission path in a voice-frequency transmission system in such a manner as to block the transmission of voice-frequency currents during intervals of the transmission of alternating-current signalling current of a single frequency in the voice band.

It is another object to confine a voice-frequency signaling current substantially to a limited transmission path in a voice-frequency transmission system.

It is still another object to render a voice-frequency transmission path ineffective to transmit during the presence of signalling current having a frequency in the voice-frequency range.

It is a further object to preclude substantially the transmission of a voice-frequency signaling current beyond one link in a tandem multi-link voice-frequency transmission system.

It is still a further object to sectionalize substantially a tandem multi-link voice-frequency transmission system for alternating-current signaling current in the voice-frequency range.

It is yet another object to prevent the leakage of voice-frequency signaling current into the voice-frequency transmission path.

It is also an object to gate one transistor into a state of non-conduction by another transistor whenever a predetermined signal level is reached in the latter.

It is a further object to minimize the duration of a spurt of signaling tone which passes beyond the first link of a tandem telephone trunking system by gating a blocking amplifier to cut off immediately upon receipt of signaling tone.

It is a feature of the invention that the aforementioned objects are obtained without the use of an auxiliary gating stage.

It is a further feature of the invention that a momentary gating of the signal amplifier at the end of a dial pulse improves the signal-to-noise ratio of the signal receiver.

A clear and complete understanding of the invention will be obtained by considering a system embodying the invention as represented schematically in the single figure of the drawing. This invention is not, however, to be deemed limited in its application to the particular system illustrated in the drawing but is generally applicable to any multi-channel voice alternating-current amplifying system in which exclusive use of one channel alone is desired for the transmission of speech alternating currents. The single figure of the drawing represents in schematic diagram form the receiving section of a voice-frequency signaling system for telephone use which embodies the invention. Relay contacts are shown on the drawing in detached form, an "*x*" indicating a make-contact and a vertical bar, a break-contact.

The receiver section of an inband voice-frequency signaling system using vacuum tubes is disclosed in United States Patent No. 2,642,500, issued June 16, 1953, to W. W. Fritschi, R. O. Soffel and A. Weaver. In the system disclosed in the patent dial pulse and supervisory signals are transmitted over two-wire or four-wire trunks between switching centers by means of interruptions of a signaling tone lying in the voice-frequency band, for example, at 2600 cycles per second. At each switching center the trunk line is terminated in a signaling set including a transmitting section and a receiving section. The function of the transmitting section is to generate the signaling tone, to transform the direct-current dial pulses and supervisory signals into alternating-current impulses, and to apply these tone pulses to the transmitting pair of the trunk line. The function of the receiving section is to detect the presence or absence of signaling tone pulses incoming over the receiving pair of the trunk line to transform the signaling tone pulses when received into direct-current signals for operation of the switching circuits in the terminating office, and to prevent the transmission of tone pulses farther along the talking circuits. The present invention relates to an improved gating circuit using transistors and provided in the receiver section of the voice-frequency signaling unit to preclude the transmission of voice-frequency signaling current to the normal voice transmission paths of such unit.

Referring now to the single figure of the drawing, signal source 10 represents the receiving pair of an incoming four-wire trunk line over which may be received either the 2600-cycle signaling tone pulses or speech currents covering the full voice-frequency band from about 250 to 3000 cycles as disclosed in the Fritschi et al. patent, supra. Transformer 11 is common to both the voice path and the signal receiver and comprises a primary winding 12 and a pair of secondary windings 13 and 14. This transformer provides coupling between the balanced-to-ground receiving pair of the incoming trunk line and the unbalanced-to-ground voice and signal receiver circuits by way of secondary windings 13 and 14, respectively.

The voice path extends from secondary winding 13 over conductors 21, 21 to a voice amplifier circuit VA enclosed in the dot-dash box at the upper right hand of the drawing. These conductors terminate in a receiving potentiometer 22 whose adjustable arm **22*a* is connected to the base electrode of a transistor 25, which also includes base, collector and emitter electrodes in the well-known manner. The amplified output of transistor 25 is coupled by way of a transformer 31 having primary windings 32 and 33 and secondary winding 34. The latter winding is connected to a load 35** which may be a pair of lines leading through the trunk switching circuits to a called subscriber or to a tandem trunk, in the manner disclosed in the Fritschi et al. patent, supra.

The purpose of the voice amplifier is two-fold: (1) to make up for the small bridging loss of voice currents in a signaling receiver SR discussed below and (2) to prevent noise currents originating in the local switching office equipment from reaching the input of the signal receiver and causing interference thereat, the latter purpose being attributable to one-way amplifier transmission. The voice amplifier transistor 25 comprises a p-n-p type having direct and alternating-current feedback features, which will be further mentioned below. Base-to-emitter bias is supplied from a voltage divider comprising resistors 26 and 27 connected to ground across a direct-current potential source indicated by encircled minus sign 30. Collector power is supplied from source 30 by way of another voltage divider comprising resistors 29 and 36 through the primary winding 32 of output transformer 31. Capacitor 37 connected in shunt of resistor 36 decouples the transistor collector circuit from the common potential source 30. Transformer 31 has in addition to primary winding 32 a feed-back primary winding 33 connected in phase opposition (as indicated in the drawing by the dots at the outer ends of windings 32 and 33) to primary winding 32 and also connected in series with the emitter electrode of transistor 25. Direct-current bias is developed for the emitter across resistor 38 in the voice amplifier or across resistor 51 in signal receiver SR which will be subsequently described, depending on the position of the transfer contacts 70E of relay 70, as will be more fully explained hereinafter.

Whether an alternating-current input is present at input transformer 11, or not, a direct-current driving voltage for the base-emitter circuit of transistor 25 is obtained from the voltage divider comprising resistors 26 and 27 as above mentioned. This causes an emitter-to-base current to flow and results also in a corresponding emitter-to-collector current flow by the well known transistor action. The collector current flowing through the feed-back winding 33 of transformer 31 and resistor 38 or 51, as the case may be, creates a back-bias or direct-current negative-feedback on the emitter electrode of transistor 25. This feedback combined with the effective series resistance in the collector circuit provided by resistors 29 and 36 provides direct-current stabilization of the normal operating bias currents.

When an alternating-current driving voltage is applied to the base electrode of transistor 25 from the potentiometer arm 22*a*, an emitter-to-base alternating current flows and creates a corresponding amplified alternating current in the emitter-to-collector path through both the primary winding 32 and the feedback winding 33 of transformer 31. This latter alternating current is supplied by transformer action to the load circuit 35 through the secondary winding 34 of transformer 31. Inasmuch as the primary windings 32 and 33 of transformer 31 are connected in phase opposition as hereinbefore mentioned, a negative feedback current induced in the feedback winding 33 of transformer 31 is effective to reduce the alternating-current driving voltage applied to the base-emitter junction of transistor 25. This negative feedback stabilizes the alternating-current transistor action and results in an amplification factor which is independent of commercial transistor variations. Capacitor 28 connected between the collector and base electrodes of transistor 25 acts as a bypass on primary winding 32 to prevent parasitic oscillations at high frequency. The maximum gain of the voice amplifier results in an overall gain of approximately two decibels and the potentiometer arm 22*a* is adjusted so that during speech periods the required loss exists between an incoming four-wire line at signal source 10 and the two-wire path of a four-wire terminating circuit at load 35.

A zener diode 39 connected from the collector electrode of transistor 25 to ground prevents the collector circuit from being damaged by excessive voltage. This excessive voltage may be obtained from surges in the talking path represented by load 35 which are amplified several times by the turns ratio of transformer 31 in the reverse direction. Diode 39 is designed to break down in the reverse direction around 40 volts in a well known manner and limits the voltage at the collector electrode of transistor 25 to that voltage. Further operation of the circuit of the voice amplifier will be hereinafter discussed.

Turning now to the signal receiver SR indicated in the lower dot-dash box on the drawing, this receiver serves to amplify and limit, if necessary, the 2600 cycle-per second pulses of alternating-current signaling current; to detect the signaling current pulses in the presence of all other frequencies in the voice band and noise and to produce therefrom a direct current proportional in magnitude to the amplitude of the signaling current pulses; to amplify such direct current; to correct for variations in the length of the signaling current pulses; and to actuate certain control electromagnetic relays, in a manner that will hereinafter be described in detail.

The path for receiving the signaling current pulses extends from the secondary winding 14 of input transformer 11 through the secondary winding 17 of a transformer 16 to the base electrode of a transistor amplifier 40 included in the signal receiver SR. Transistor 40 serves as a link between signal source 10 and a signal and guard frequency detector 45. Direct-current base-emitter bias for transistor amplifier 40 is supplied from potential source 30 and a voltage divider comprising resistors 23 and 24; and a direct-current bias for the associated collector electrode is obtained from source 30 through a resistor 42. In addition, the emitter electrode is dynamically biased at the emitter bias potential of transistor 60 through resistors 41, 56 and potentiometer 44. Capacitor 46, which is connected between the slidable contactor of potentiometer 44 and ground and which shunts part of the emitter load of transistor 40 to ground, decreases in reactance with increase in frequency. It therefore loads the emitter circuit of transistor 40 more than the lower frequencies and makes the signal receiver more sensitive at the frequency of the signaling tone. Variations in frequency response of the signal and guard detector circuits with age can be compensated for by adjustment of slidable contactor on potentiometer 44.

A deliberate mismatch between the secondary winding 14 of transformer 11 and the base of transistor 40 is effected to avoid transmission bridging loss in the voice path. Initially, the input of the full voice frequency band is applied to transistor 40 directly from secondary winding 14 by way of resistor 15 and secondary transformer winding 17 assuming relay contacts 70B and 70D are open. Later, after relay 70 has been operated in a manner to be subsequently pointed out, make contact 70D connects primary winding 18 of transformer 16 in series with capacitor 19, the latter series connection being in shunt of conductors 21, 21. Capacitor 19 and winding 18 are so chosen with electrical parameters as to be series resonant at the signaling frequency of 2600 cycles per second. Therefore, shortly after the application of signaling current tone to input transformer 11, the predominant frequency appearing across winding 18 is 2600 cycles. At the same time that contact 70D connects the series resonant circuit 18, 19 in shunt of conductors 21, 21, contact 70B also closes to short-circuit winding 14 of transformer 11 through resistor 15. This properly termintes winding 14 and tends to eliminate interaction between the alternating-current voltages of windings 14 and 17. This as a further consequence tends to limit the input to transistor 40 to signaling current primarily and thereby to contribute to the decreased frequency selectivity desired after relay 70 operates.

Signal and guard detector 45, coupled to the collector of transistor 40 through capacitor 43, comprises both signal and guard detection circuits which are more fully described in the aforementioned Fritschi et al. patent. Briefly, the signal and guard detector 45 may include, for example, parallel and series L–C circuits resonant at the frequency of signaling current, each of which circuits is shunted by a half-wave rectifier and a resistor-capacitor load. Across the resistor-capacitor loads are developed direct voltages proportional respectively to the amounts of alternating-current voltages corresponding to the signaling current and other than signaling current present in the output of signal source 10 and amplifier 40. Whenever the guard—other than signaling—voltage predominates as during a subscriber conversation, the direct-current output voltage of detector 45 is applied to the base of a direct-current transistor amplifier 50 to cut off the latter and prevent operation of signal relays 65 and 70 which will be later mentioned. When, however, pure signaling current predominates, the signal voltage exceeds the guard voltage and the direct-current amplifier 50 is caused to conduct. The presence of the guard voltage at all times is an important factor in avoiding signal imitation by speech. However, when relay 70 is operated, the guard frequency feature is eliminated and the frequency response becomes less selective to permit relay 70 to hold operated if speech currents are superimposed on the 2600-cycle signaling current. The degree of selectivity is such that the receiver releases when a 2600-cycle signal current is followed by an audible busy tone.

The direct-current amplifier and pulse correcting portion of the signal receiver comprise transistor amplifiers 50 and 60 and associated circuitry. The guard principle employed in the signal detector is insufficient alone to produce the required immunity from speech simulation of signaling tone. Therefore, electronic time delay is employed to supplement the action of the signal detector. Transistor amplifier 50 has associated with its emitter electrode resistors 49 and 51 in series to ground, the resistor 51 being part of a gating circuit to be hereinafter discussed. Collector biasing potential is derived from a voltage divider comprising potentiometer 47 and resistor 48 connected in series between potential source 30 and ground. The collector electrode is connected to the junction of the resistor 48 and potentiometer 47. The emitter of transistor 50 is connected to the base of transistor 60 through resistors 52 and 57. Also included in the circuit connecting transistors 50 and 60 are capacitor 53, diodes 54 and 55 and resistor 56. In the absence of signaling current at the input of detector 45, the guard voltage output of detector 45 biases transistor 50 to cut off. Transistor 60 includes in its collector-emitter circuit the operating winding of a sensitive electromagnetic relay 65 and a voltage divider comprising resistors 59, 61 and 62 connected in series between potential source 30 and ground.

The operation of the direct-current amplifiers 50 and 60 is substantially as follows. When the signal and guard detector 45 receives sufficient signaling current to overcome the guard voltage, a driving voltage is applied by this detector to the base of transistor 50 with a magnitude which is sufficient to cause saturation collector current to flow therein. Under this condition the voltage drop from emitter to collector of transistor 50 is small and the current flowing through series resistors 49 and 51 is substantially only the collector current. This creates eventually an emitter-to-base bias on transistor 60, which is adequate in magnitude to cause transistor 60 to operate and thereby to draw current therein except for the presence of capacitor 53 and its associated charging and discharging circuits. In the absence of signaling current, capacitor 53 is rapidly charged from potential source 30 over a path which is traced from ground through resistors 62, 56, diode 54, capacitor 53 and potentiometer 47 to negative source 30. In this event, transistor 60 is cut off.

When transistor 50 becomes saturated, i.e. is in conduction or is operated, capacitor 53 discharges through diode 55, resistors 57 and 52, emitter and collector junctions of transistor 50, and potentiometer 47. The discharging current through resistors 52 and 57 produces a voltage which initially exceeds, and is in opposition to, the voltage across resistors 49 and 51 in the emitter circuit of transistor 50. As a result, transistor 60 cannot conduct until the discharging current from capacitor 53 decays to such an extent to which the discharging current produces a voltage across series resistors 52 and 57 which is less than the voltage produced across series resistors 49 and 51 by a predetermined amount. Thereupon the last-mentioned voltage is applied to the base of transistor 60 and institutes conduction therein. Thus electronic delay is provided between the times of operation of transistors 50 and 60 in succession and this delay prevents false operation on spurious speech-simulated signaling-tone spurts of short duration. Potentiometer 47 can be adjusted to establish the minimum tone duration which will operate transistor 60 and relays 65 and 70, ordinarily a time duration of about 36 milliseconds.

After the expiration of the aforementioned electronic time delay and conduction of transistor 60, collector current is drawn from potential source 30 through resistor 59 and the operating winding of electromagnetic relay 65 causing relay 65 to operate and thereby close make-contact 65A which is included in a local circuit with the operating winding of relay 70 and potential source 30. The operation of electromagnetic relay 70 closes make-contact 70A to provide ground by way of lead 67 for a purpose that will be hereinafter mentioned. Capacitor 58, connected between the collector of transistor 60 and the emitter of transistor 50, reduces the effect of direct-current transients on the operation of transistor 60.

A feature for correcting the length of the signaling current pulses will now be explained. Before the operation of relay 70, capacitor 64 is charged from potential source 30 through resistor 66 and transfer contact 70F of relay 70. After relay 70 operates, capacitor 64 is connected to the base of transistor 60 through the make-portion of transfer contact 70F, potentiometer 63 and resistor 57. Capacitor 64 thereupon discharges to ground through resistor 62, the base-emitter junction of transistor 60, resistor 57 and potentiometer 63. The discharge current of capacitor 64 through the base-emitter junction of transistor 60 is in such a direction as to maintain the latter transistor in conduction for a predetermined minimum period of time, depending on the setting of the sliding contact on potentiometer 63. This holds relay 65 operated whereby relay 70 is held operated to maintain ground on lead 67. Hence, short signaling pulses can be lengthened.

Longer pulses determine the operate time of transistor 60 and relays 65 and 70 independently of capacitor 64 for the reason that the discharge current has decayed sufficiently to be ineffective when the pulse terminates. Since the charging current of capacitor 53 works in opposition to the discharging current of capacitor 64, the stronger electrical effect between these currents prevails so that either relays 65 and 70 release immediately or remain operated for a short interval. On the other hand, if a succeeding signaling-tone pulse is received while transistor 60 is being held in conduction by the discharge current of capacitor 64, capacitor 53 begins its discharge, rapidly overcomes the discharge current of capacitor 64, and cuts off transistor 60, thereby promptly releasing relays 65 and 70. After capacitor 53 has discharged sufficiently as has been previously explained, transistor 60 is restored to conduction by the voltage across series resistors 49 and 51 and relays 65 and 70 are again operated. Thus, signaling pulses can be lengthened or shortened, and a uniform definite time interval is provided between pulses regardless of length of on-time for a particular rate of pulsing.

It may be noted that there is a connection from the junction of resistor 56 and diode 54 by way of potentiometer 44 and resistor 41 to the emitter electrode of transistor amplifier 40 at the input of the signal receiver. In the absence of charging currents for capacitor 53 through resistor 56, a normal bias for transistor 40 is established by the setting of potentiometer 44, which acts as a sensitivity control for the signal receiver. However, the charging current for capacitor 53 through resistors 56 and 62 produces a voltage in the emitter load of transistor 40 which back-biases the latter transistor and desensitizes it to spurts of noise or spurious signaling tone following the end of a pure signaling-tone pulse. Thus, such short noise or tone spurts following a legitimate tone pulse are ineffective to prevent release of the signal receiver. This momentary control of transistor 40 by the charging current for capacitor 53 flowing through resistors 56 and 62, which are common to the emitter loads of transistors 40 and 60, improves dialing performance of the signal receiver in the presence of high level random noise in the trunking connections. Without this control the signal receiver may tend to hold operated continuously over a dial-pulse train, but with this action short spurts of noise or weak tone transients following immediately upon the cessation of a legitimate dial tone pulse are disregarded by the signal receiver. A minimum release time between individual dial pulses is thereby insured and individual dial pulses of a train are accurately repeated by the signal receiver. As much as a ten-decibel improvement in signal-to-noise ratio is achieved in reproducing dial pulses. The function of capacitor 46 with respect to its effect on the emitter bias of transistor 40 has been previously discussed.

Besides the function of delivering a ground response by way of make-contact 70A and lead 67 to the switching circuits of a telephone office as mentioned in the Fritschi et al. patent, supra, relay 70 in response to its operation performs other functions as well. Several of these have already been discussed. An important additional function is to prevent the transmission of signaling current through the voice amplifier to through connecting circuits as represented by load 35. This is accomplished by way of the previously mentioned contacts 70C and 70D which are effective to introduce a band-elimination filter for signaling tone in the path of the voice amplifier in a manner which will now be described. The band-elimination filter comprises two sections; namely, a parallel capacitor-inductor circuit 20 resonant at signaling-tone frequency and a series circuit also resonant at signaling-tone frequency and including capacitor 19 and the primary winding 18 of transformer 16 as hereinbefore described. Parallel resonant circuit 20 is introduced in series with the voice amplifier by the opening of break-contact 70C, and the series resonant circuit is shunted across the conductors 21, 21 leading to the voice amplifier by the closing of make-contact 70D. This effectively blocks the transmission of signaling current over the voice path so as to confine the signaling effect to a single link in a multi-link voice trunking circuit. At the same time speech with a narrow 2600-cycle band eliminated can be transmitted over the voice path between operators, for example, for intercept or supervisory purposes. Because relay 70 does not operate immediately upon receipt of signaling tone due to the aforementioned electronic time delay and to the mechanical inertia of relays 65 and 70, the first 40 to 50 milliseconds of signaling tone would tend to leak through the voice amplifier into the next succeeding trunking link, if any, and thereby cause spurious operation of other signaling circuits.

To avoid this result a gating circuit according to the invention effects an earlier blocking of the voice amplifier for the time period between receipt of signaling tone and operation of relay 70, in a manner which will now be explained. It will be noted that resistor 51 by virtue of the interconnecting path provided by lead 68 is common to the emitter circuits of direct-current amplifier transistor 50 in the signal receiver and voice amplifier transistor 25 before relay 70 operates because of the latter's transfer contacts 70E. In the absence of signaling tone the guard portion of the signal detector 45 back-biases the base-emitter junction of transistor 50 sufficiently to hold the latter in a cut-off condition. All the current then flowing in resistor 51 is derived from the operation of the voice amplifier. However, as soon as signaling tone of sufficient amplitude to overcome the normal base-emitter back-bias is received, transistor 50 is biased into the conducting state and consequently the emitter current of transistor 50 also flows through resistor 51 to ground. The increased voltage across resistor 51 is then sufficient to back-bias the voice amplifier transistor into the cut-off condition. This action can occur within two to five milliseconds of the receipt of signaling tone, and therefore more effectively blocks the voice amplifier even when the signaling tone spurt may prove to be spurious and insufficient in duration to cause operation of relay 70. A signal of proper time duration eventually actuates relay 70, which is provided with a further transfer contact 70E. This contact transfers the connection of the emitter circuit of transistor 25 from resistor 51 to resistor 38, thereby terminating the gating period. As above described, relay contacts 70C and 70D are at the same time actuated to introduce the band-elimination filter into the voice path, as previously mentioned.

While the gating circuit of this invention has been described with reference to a particular embodiment in a voice-frequency signaling system, it is to be understood that such embodiment is intended to be illustrative of the principles of the invention and that numerous other embodiments may be devised by those skilled in the art without departing from the spirit and scope of the invention. For example, the invention is as well applicable to other multi-channel signal amplifying transmission systems in which it is desired that only one channel be used at a given time and a signal present in one channel can block the transmission of a second signal over the other channel or channels.

What is claimed is:

1. In a voice-frequency signaling system comprising a source of voice and signaling currents of which the signaling current is a single frequency lying in the voice-frequency band, a load, a transistor including base, emitter and collector electrodes for amplifying voice-frequency currents, means for coupling said base electrode to said source and said emitter and collector electrodes to said load, coupling means normally rendering said transistor effective to transmit voice currents from said source to said load, and means responsive to the signaling current for applying a biasing voltage of sufficient magnitude to said emitter electrode to cut off said transistor and thereby block the transmission of voice currents from said source to said load.

2. The signaling system according to claim 1 in which said responsive means includes essentially resistive means having one terminal grounded and another terminal coupled to said signaling source and means for connecting said last-mentioned terminal to said emitter load.

3. The signaling system according to claim 1 in which said responsive means includes means for rectifying the signaling current, means for amplifying the rectified current, said last-mentioned means comprising a further transistor having base, emitter and collector electrodes, means for connecting said last-mentioned base and emitter electrodes to the output of said detecting means, said detecting means biasing said last-mentioned base electrode and thereby said further transistor to cut-off in the absence of signaling current but biasing said further transistor to conduction in response to the rectified current, essentially resistive means, means for connecting said resistive means in circuit with said further transistor emitter and collector in such manner that said resistive means is connected between said further transistor emitter electrode and ground, and means for connecting said first-mentioned emitter electrode to a terminal common to said further transistor emitter electrode and resistive means.

4. The signaling system according to claim 3 which includes a filter having a passband centered at the signaling frequency and connectable in circuit with said coupling means between said source and first-mentioned transistor base electrode, and a third transistor having base, emitter and collector electrodes; means including a charged capacitor for biasing said third transistor base and thereby said transistor to cut-off in the absence of conduction in said further transistor, said capacitor discharging through the collector and emitter of said further transistor to reduce the bias on said third transistor base to a predetermined extent thereby enabling conducion to commence therein; and an electromagnetic relay having an operating winding connected in circuit with said collector and emitter electrodes of said third transistor, said relay operating in response to conduction in said third transistor to connect said filter in said circuit with said coupling means for precluding the transmission of signaling current to said load.

5. The signaling system according to claim 4 in which said relay operating in response to conduction in said third transistor disconnects said resistive means from the circuit with said first-mentioned emitter electrode and connects a second resistive means in circuit therewith for removing such magnitude of biasing voltage from said last-mentioned electrode as to enable the transmission of voice currents through said first-mentioned transistor.

6. In a signaling system employing signaling current in the voice frequency range, a source of voice and signaling currents, a first transistor for amplifying voice currents, said transistor having a base, a collector and an emitter, means for coupling said base to said source, a load coupled to said collector, a pair of filter networks tuned to the frequency of said signaling currents, a signal responsive relay for controlling the connection of said filter networks to said coupling means to preclude the transmission of signaling current into said load, said relay having a predetermined minimum operating interval, means coupled to said source through said filter for amplifying pure signaling current and for converting signaling current to direct-current form including a second transistor having at least an emitter, a resistor in circuit with the emitters of said first and second transistors for developing a voltage thereacross in response to converted signaling current flowing in the emitter circuit of said second transistor of sufficient magnitude to gate said first transistor into non-conduction for at least said predetermined interval.

7. The signaling system in accordance with claim 6 in which a further resistor connectable to the emitter of said first transistor only is placed in circuit therewith upon actuation of said relay to prepare said first transistor for further transmission of voice currents.

8. In a signaling system in which current of a particular frequency within the voice band is used to effect transmission of signals, an amplifier for voice frequency currents including a first transistor having at least an emitter, an alternating-current amplifier for signaling current, a detector responsive only to signaling currents coupled to said signaling-current amplifier for rectifying said signaling current, a direct-current amplifier for said rectified signaling current, said last-mentioned amplifier including a second transistor having an emitter, relay means adapted to be actuated by said direct-current amplifier for repeating said alternating signaling current as direct-current pulses, and means for precluding the transmission of signaling current through said first transistor comprising a resistor common to the emitter circuits of said first and second transistors, the potential developed across said resistor by the rectified signaling current flowing in the emitter circuit of said second transistor being of sufficient amplitude to gate said second transistor into the cut-off condition.

9. In combination with the signaling system of claim 8 a blocking filter for signaling current, a further resistor in said voice amplifier having one end grounded, a first contact on said relay for connecting said blocking filter in series with said voice-frequency amplifier to block signaling current from said amplifier and to transmit the voice-frequency band, and a second contact on said relay connecting the ungrounded end of said further resistor to the emitter of said first transistor in place of said first-mentioned resistor for rendering ineffective the gating action of said second transistor on said first transistor.

10. The combination of the signaling system of claim 8 and means for automatically desensitizing said alternating-current signaling amplifier to impulse noise and spurious currents of signaling frequency for the period immediately following a legitimate tone pulse comprising a third transistor having at least an emitter electrode included in said alternating-current amplifier, a fourth transistor having at least an emitter electrode included in said direct-current amplifier for directly actuating said relay means, and a resistor in common circuit with the emitters of said third and fourth transistors, the voltage developed across said resistor at the end of a tone pulse being a back-bias on the emitter of said third transistor.

11. The combination according to claim 10 in which the charging path for said capacitor includes a potentiometer for selecting the predetermined time interval between conduction periods in said third and fourth transistors.

12. In combination, a source of voice-frequency energy and of signaling energy having a predetermined frequency within the voice-frequency band, a first channel for amplifying said voice-frequency energy, a second channel for amplifying and detecting signaling energy in the presence of said voice-frequency energy, means for coupling said source to said first and second channels, said first channel comprising a first transistor including an emitter, said second channel comprising a second transistor including an emitter for amplifying signaling energy on an alternating-current basis, detector means coupled to said second transistor for deriving a direct-current potential proportional to the resultant algebraic difference between voice frequency and signaling energies amplified by said second transistor, a third transistor including an emitter driven by said direct-current potential and adapted to being cut off by said potential in the absence of signaling energy and to being rendered conductive in the presence of signaling energy, a first resistor in circuit with the emitters of said first and third transistors, the voltage developed across said resistor during conduction of said third transistor being sufficient to hold said first transistor in the cut-off condition thereby blocking the transmission of voice-frequency energy through said first channel, a fourth transistor including an emitter directly coupled to the emitter of said third transistor, a second resistor in the direct coupling path linking said third and fourth transistors, relay means in circuit with said fourth transistor adapted to be operated by the conduction of said fourth transistor, said relay means repeating a direct-current output signal corresponding to the presence or absence of signaling energy from said source, a third resistor in circuit with the emitters of said second and fourth transistors, a capacitor in circuit with said third and fourth transistors, means for reducing the gain of said second transistor when short spurts of signaling energy are received immediately following a tone pulse comprising said third resistor, a charging path for said capacitor including said third resistor effective for the cut-off period of said third transistor, the potential developed across said third resistor by the emitter current of said fourth transistor and the charging current of said capacitor being effective as a momentary back-bias on the emitter of said second transistor, and means for delaying for a predetermined time interval the start of conduction in said fourth transistor with respect to the start of conduction in said third transistor comprising a discharge path for said capacitor including said second resistor, the potential developed across said second resistor being oppositely poled with respect to the potential developed across said first resistor.

References Cited in the file of this patent

UNITED STATES PATENTS 2,651,684 Hargreaves ---------------- Sept. 8, 1953